R. H. RICE.
SHAFT COUPLING.
APPLICATION FILED SEPT. 7, 1912.
1,156,493.                                    Patented Oct. 12, 1915.
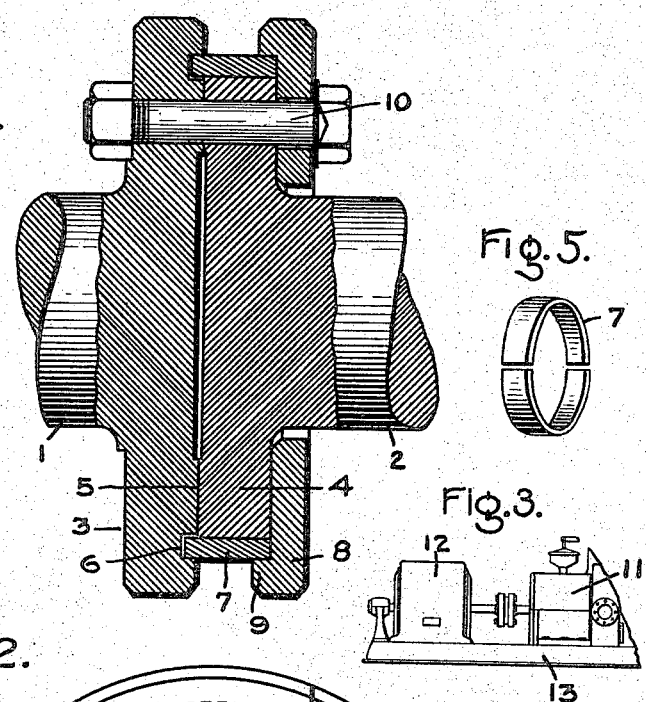
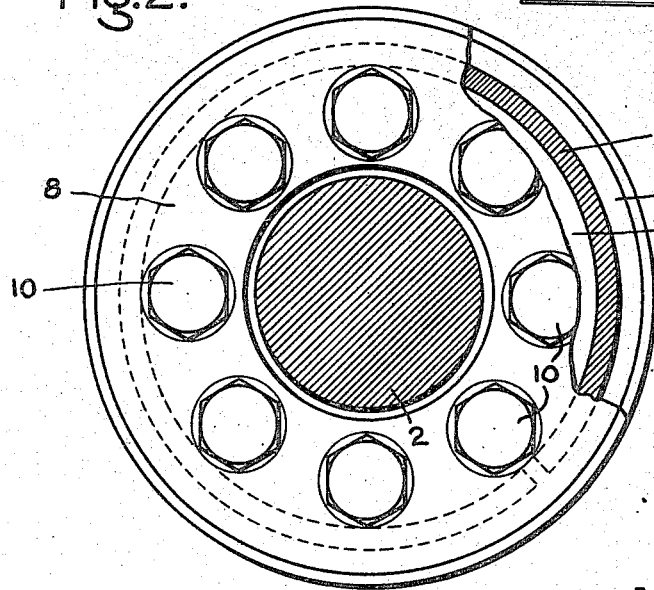
Witnesses
Marcus L. Byng.
Anthony E. Marr.
Inventor,
Richard H. Rice,
by Albert G. Davis
Att'y.

UNITED STATES PATENT OFFICE.

RICHARD H. RICE, OF LYNN, MASSACHUSETTS, ASSIGNOR TO GENERAL ELECTRIC COMPANY, A CORPORATION OF NEW YORK.

SHAFT-COUPLING.

1,156,493.  Specification of Letters Patent.  Patented Oct. 12, 1915.

Application filed September 7, 1912. Serial No. 719,098.

*To all whom it may concern:*

Be it known that I, RICHARD H. RICE, a citizen of the United States, residing at Lynn, county of Essex, State of Massachusetts, have invented certain new and useful Improvements in Shaft-Couplings, of which the following is a specification.

This invention relates to devices for coupling together the adjacent ends of alined shafts, and its object is to provide a coupling which will permit the shafts, when uncoupled, to be moved out of alinement without any endwise movement.

The ordinary shaft coupling comprises two face-plates which are kept in alinement by a shallow recess on one, receiving an annular rabbet on the other; the two plates being fastened together by through bolts. When such a coupling is taken apart, the members must be separated axially before they can be moved out of alinement. This is very inconvenient when the coupling is used to unite the shafts of two pieces of apparatus mounted on a common bed-plate or set up close together in a location where axial separation is inconvenient or impossible. For example, where an electric generator is driven by a horizontal steam turbine, their respective shafts are coupled in alinement. If it becomes necessary to remove the shaft of either machine, it must be lifted out of its bearings without endwise movement, and this cannot be done if the shaft coupling comprises face-plates rabbeted together.

The present invention overcomes this difficulty by providing smooth face-plates bolted together, with a ring clamped on one and entering a groove in the other. By this construction, the ring keeps the shafts in alinement, and yet by taking out the bolts and removing the ring one shaft can be displaced out of alinement with the other without any axial movement.

In the accompanying drawing, Figure 1 is a longitudinal section of a shaft coupling embodying my invention; Fig. 2 is an end view partly in section; Fig. 3 is a sketch of a direct-connected turbo-generator in which the coupling is used; Fig. 4 shows on a small scale a single split ring, and Fig. 5 a ring made in sections.

Integral with or secured to the two shafts 1, 2 are the face-plates 3, 4, both having smooth faced-off surfaces 5 which abut in a plane of revolution when the shafts are in position. The face-plate 3 is of greater diameter than the other, and contains a concentric groove 6 flush with the cylindrical periphery of the face-plate 4. A ring 7 surrounds the latter face-plate and enters the groove 6. Said ring may be split, as shown in Fig. 4, or made in two or more sections, as shown in Fig. 5, to facilitate assembling. The ring is suitably retained in place, preferably by means of a separate annular clamping member 8, in one or more pieces, placed against the back of the face-plate 4 and having a flange 9 which overlaps the ring 7. The face-plates are fastened together, preferably by bolts 10 passed through holes in the two face-plates and the clamping member. When thus assembled, the ring 7 keeps the shafts accurately in line, despite any looseness of the bolts. The clamping member prevents the ring from coming off, and the bolts transmit the torsional strains from one shaft to the other. If the machine is a turbo-generator, comprising a steam turbine 11 and a generator 12 mounted on a common bed-plate 13, the shaft of either part can be lifted out of its bearings by taking out the bolts 10, removing the clamping member 8 and the ring 7, and then hoisting the shaft; the face-plate thereon sliding easily up past the other without hindrance.

In accordance with the provisions of the patent statutes, I have described the principle of operation of my invention, together with the apparatus which I now consider to represent the best embodiment thereof; but I desire to have it understood that the apparatus shown is only illustrative, and that the invention can be carried out by other means.

What I claim as new and desire to secure by Letters Patent of the United States, is:—

1. A shaft coupling which comprises two smooth face plates, one of which has an annular groove in its face coaxial with the cylindrical periphery of the other, a ring entering said groove and surrounding the other face plate, and means for fastening said face plates together.

2. A shaft coupling which comprises two smooth face plates, one of which has an annular groove in its face coaxial with the cylindrical periphery of the other, a ring entering said groove and surrounding the other face plate, and means for retaining said ring in place and for fastening said face plates together.

3. A shaft coupling which comprises two smooth face plates, one of which has an annular groove in its face coaxial with the cylindrical periphery of the other, a ring entering said groove and surrounding the other face plate, an annular clamping member engaging with said ring, and means for fastening together the two face plates and the clamping member.

4. A shaft coupling which comprises two smooth face plates, one having a groove coaxial with and flush with the cylindrical periphery of the other, a ring surrounding the latter and entering said groove, an annular member having a flange overlapping said ring, and bolts passing through said face plates and annular member.

5. A shaft coupling which comprises two smooth face plates, one of which has an annular groove in its face coaxial with the cylindrical periphery of the other, a ring entering said groove and surrounding the other face plate, and means for clamping said ring to said other face plate and for fastening said face plates together.

6. A shaft coupling which comprises two smooth face plates, one of which has an annular groove in its face coaxial with the cylindrical periphery of the other, a ring entering said groove and surrounding the other face plate, a member for clamping said ring to said other face plate, and common means for fastening said member and face plates together.

In witness whereof, I have hereunto set my hand this fifth day of September, 1912.

RICHARD H. RICE.

Witnesses:
   JOHN A. MCMANUS, Jr.,
   FRANK H. JOHNSON.